US010751573B2

(12) United States Patent
Lu

(10) Patent No.: US 10,751,573 B2
(45) Date of Patent: Aug. 25, 2020

(54) WEIGHT LOADING SYSTEM FOR FITNESS EQUIPMENTS

(71) Applicant: NINGBO JADA HEALTH TECH CO., LTD., Ningbo, Zhejiang (CN)

(72) Inventor: Weidong Lu, Zhejiang (CN)

(73) Assignee: NINGBO JADA HEALTH TECH CO., LTD., Ningbo, Zhejiang (CN)

( * ) Notice: Subject to any disclaimer, the term of this patent is extended or adjusted under 35 U.S.C. 154(b) by 259 days.

(21) Appl. No.: 15/381,623

(22) Filed: Dec. 16, 2016

(65) Prior Publication Data

US 2017/0173396 A1 Jun. 22, 2017

(30) Foreign Application Priority Data

Dec. 18, 2015 (CN) .......................... 2015 1 0957361
Dec. 18, 2015 (CN) .................... 2015 2 1065231 U

(51) Int. Cl.
*A63B 24/00* (2006.01)
*H02P 6/32* (2016.01)
(Continued)

(52) U.S. Cl.
CPC ...... *A63B 24/0087* (2013.01); *A63B 21/0058* (2013.01); *A63B 21/154* (2013.01);
(Continued)

(58) Field of Classification Search
CPC ... A63B 24/0087; A63B 21/22; A63B 21/154; A63B 21/4035; A63B 21/0058; A63B 2220/34; A63B 21/4043; A63B 2220/10; A63B 23/1209; A63B 23/0233; A63B 2220/51; A63B 2220/36; A63B 2220/35;
(Continued)

(56) References Cited

U.S. PATENT DOCUMENTS 6,952,063 B1 * 10/2005 Chen .................. A63B 21/0051
188/161
7,682,287 B1 * 3/2010 Hsieh .............. A63B 21/00196
482/1

(Continued)

*Primary Examiner* — Loan B Jimenez
*Assistant Examiner* — Shila Jalalzadeh Abyaneh
(74) *Attorney, Agent, or Firm* — Charles C. Achkar; Ostrolenk Faber LLP.

(57) ABSTRACT

A weight loading system for fitness equipments includes a fitness equipment support, a rally rope, a motor, a motor driving and a motor control unit. The motor is a permanent magnet brushless DC motor with an external rotor structure, and the motor includes a stator mounted onto the fitness equipment support and an external rotor sheathed on the stator and rotatable with respect to the stator, and the rally rope is wound around the external rotor of the motor, and an end of the rally rope is coupled to the external rotor of the motor, and the other end of the rally rope is coupled to the power driving mechanism of the fitness equipment; the power driving mechanism is provided for driving the external rotor of the motor through the rally rope to rotate and generate a rally, and the motor control unit controls the motor to rotate in an opposite direction through the motor driving module, so as to produce a load force opposite to the rally. The weight loading system for fitness equipments structure is simple, lightweight, and achieves the effect of a stepless weight control.

5 Claims, 4 Drawing Sheets

2
5
6
12
11
1
4
7

(51) Int. Cl.

| | |
|---|---|
| ***A63B 21/005*** | (2006.01) |
| ***A63B 21/00*** | (2006.01) |
| *A63B 22/00* | (2006.01) |
| *A63B 23/035* | (2006.01) |
| *A63B 23/02* | (2006.01) |
| *A63B 23/12* | (2006.01) |

(52) U.S. Cl.
CPC ............ *A63B 21/4035* (2015.10); *H02P 6/32* (2016.02); *A63B 21/4043* (2015.10); *A63B 23/0233* (2013.01); *A63B 23/03525* (2013.01); *A63B 23/1209* (2013.01); *A63B 2022/0079* (2013.01); *A63B 2220/10* (2013.01); *A63B 2220/34* (2013.01); *A63B 2220/36* (2013.01); *A63B 2220/51* (2013.01); *H02P 2207/05* (2013.01)

(58) Field of Classification Search
CPC ...... A63B 23/03525; A63B 2022/0079; H02P 6/00; H02P 2207/05; H02P 6/32
See application file for complete search history.

(56) References Cited

U.S. PATENT DOCUMENTS

2009/0174271 A1* 7/2009 Lin ........................ H02K 1/146 310/153
2015/0165272 A1* 6/2015 Bird ................... A63B 21/0058 482/5

* cited by examiner

WEIGHT LOADING SYSTEM FOR FITNESS EQUIPMENTS

FIELD OF INVENTION

The present invention relates to the field of fitness equipments, in particular to a weight loading system for fitness equipments.

BACKGROUND OF INVENTION

1. Description of the Related Art

In general, a conventional fitness equipment uses an iron block as a weight load. As disclosed in P.R.C. Pat. Publication No. CN 204380069 U, a load rally device has a main function of loading a weight by selecting a clump weight with an appropriate weight according to a user's force, but such device has the following drawbacks. The fitness equipment has a large frame and a heavy total weight and occupies much space, and thus it is inconvenient to move and install. Besides the places such as gym, it is difficult for such device to enter into the household market.

Therefore, another conventional fitness equipment as disclosed in P.R.C. Pat. Publication No. CN 202699935U is introduced into the market, and such fitness equipment relates to a muscle training control device comprising a motor combined with a beam load sensor, and it specifically discloses a beam load sensor, a motor, a gear reducer, a linkage mechanism, an operating rod, wherein the motor has a structure of a brushless motor or a DC motor, wherein a torque is produced at an end of the motor 31, and the gear reducer 32 reduces the speed to increase the torque value, and transmits the speed to a driving arm 33, the beam load sensor 46, front and rear panels 42, 41, a link rod 43, a crank 45, a rocker arm 44, and finally to the operating rod 50. Regardless of operating the operating rod by hand or leg, the user's muscle has to bear the torque of the motor increased by the gear reducer. In other words, the user controls and operates the operating rod, and the motor produces a torque through the gear reducer to form a resistance for training the user's muscle. In the specific principle, the torque produced by a shaft of the motor is used to replace the traditional iron block, and thus simplifying the structure, reducing the weight and volume of the machine, and lowering the noises. Such patent integrates the accurate sensing function of the beam load sensor, feeds back the load value to the control device, drives the motor after correcting the difference, and achieves the user's expected exercise load. This patent allows user to set a continuous and smooth variable load to achieve the best muscle training effect, but the fitness equipment of such parent also has the following drawbacks:

1. Since the output end of the motor is the main shaft, the torque is small, and the rotating speed is high, therefore the reducer is installed to reduce the speed and increase the torque. As a result, the structure and operation become very complicated and cumbersome, and incur a high cost.

2. The linkage mechanism and operating rod of the mechanical structure are adopted to transmit the torque increased by the reducer to a driving mechanism for the force operation of a human body, so that both structure and operation are very complicated and the cost is even higher.

Therefore, users may want to change the load of the fitness equipment and use an electromagnetic load to replaced the conventional iron block to overcome the aforementioned drawbacks. In the meantime, a man-machine operation interface for controlling the electromagnetic load is installed additionally to improve the quality of the new-generation fitness equipment and upgrade the level of the fitness equipment.

2. Summary of the Invention

In view of the aforementioned drawbacks of the prior art, the inventor of the present invention based on years of experience in the related industry to conduct extensive research and experiment, and finally developed a weight loading system for fitness equipments to overcome the drawbacks of the conventional weight loading system having a complicated structure, a large volume, a heavy weight, and a high cost.

To overcome the aforementioned drawbacks, it is a primary objective of the present invention to overcome the drawbacks of the prior art and provide a weight loading system for fitness equipments comprising a fitness equipment support, a rally rope, a motor, a motor driving module, and a motor control unit.

The motor is a permanent magnet brushless DC motor with the external rotor structure, and the motor includes a stator mounted onto the fitness equipment support and sheathed on the stator and rotatable with respect to an external rotor of the stator, and the rally rope is wound around the external rotor of the motor, and an end of the rally rope is coupled to the of the external rotor of the motor, and the other end of the rally rope is coupled to a power driving mechanism of the fitness equipment; the power driving mechanism is provided for driving the external rotor of the motor to be rotated through the rally rope, and the motor control unit controls the motor to rotate in an opposite direction through the motor driving module and to produce a load force opposite to the rally.

The weight loading system for fitness equipments further comprises a tension sensor for detecting the currently produced rally of the power driving mechanism.

In the weight loading system for fitness equipments, the power driving mechanism is a handle ring or a rally bar, and a human body may produce a rally through the handle ring or the rally bar to control the rally rope to drive the external rotor of the motor.

The weight loading system for fitness equipments further comprises a pulley installed to the fitness equipment support and coordinated with the transmission of the rally rope.

In the weight loading system for fitness equipments, the motor is a wheel hub type motor.

The weight loading system for fitness equipments further comprises an operation interface module, a torque control unit, a current regulating unit, a position sensing circuit and a power switch module; and the motor driving module comprises a synchronous PWM generating unit, The position sensing circuit is provided for sensing a rotating position and a rotating speed of the external rotor to determine whether the rally rope is situated in a stretched status or a retracted status, and the motor control unit includes a memory unit for recording an initial position of the external rotor to control the external rotor to return to its initial position.

The operation interface module is provided for inputting an analog electromagnetic force Fe, such that when the tension sensor detects the rally Fc produced by the power driving mechanism (6) currently, the motor control unit regulates the current of the motor according to the difference of the rally Fe−Fc by the torque control unit and the current regulating unit, and a control module of the motor controls transmitting the current information and switch status module to the power switch module by the synchronous PWM generating unit to drive the motor to work or generate electric power.

The weight loading system for fitness equipments further comprises a battery, such that when the rally rope on the external rotor is situated at a stretched status, the winding of the motor produces a potential, and the power switch module transmits and stores the electricity generated by the potential into the battery, and the electricity stored in the battery provides a driving force to the external rotor when the rally rope is being retracted.

The weight loading system for fitness equipments further comprises two switches for increasing and decreasing the electromagnetic force Fe, and the switches are coupled to the motor control unit.

The weight loading system for fitness equipments further comprises a motor rotating speed calculation unit and a current converting position calculation unit, wherein the motor rotating speed calculation unit and the current converting position calculation unit are controlled by and coupled to the synchronous PWM generating unit, and the motor rotating speed calculation unit is provided for calculating the rotating speed and direction of the external rotor, and the current converting position calculation unit is provided for calculating a switch status required by the power switch module according to the information of the position sensing circuit.

In the weight loading system for fitness equipments, when the rally rope is in the retracted status and $Fe>Fc$, the torque control unit and the current regulating unit are used to increase the current; when the rally rope is in the retracted status and $Fe<Fc$, the torque control unit and the current regulating unit are used to decrease the current; when the rally rope is in the stretched status and $Fe>Fc$, the torque control unit and the current regulating unit drive the motor to be situated in a resisted status through the power switch module.

When the rally rope is in the stretched status and $Fe<Fc$, the torque control unit and the current regulating unit charge the battery by the power switch module.

When the rally rope is in the stretched status and $Fe>Fc$, the torque control unit and the current regulating unit drive the motor to be situated in a resisted status through the power switch module; and when the rally rope is in the stretched status and $Fe<Fc$, the torque control unit and the current regulating unit charge the battery by the power switch module.

The present invention further provides a weight method comprising the following steps:

Set the magnitude of an analog electromagnetic force Fe, and detect the current rally Fc by a rally sensor, increase a duty cycle by a PWM method to increase the current of the motor when $Fe-Fc>0$, and decrease the duty cycle to decrease the current of the motor when $Fe-Fc<0$.

Detect the current current of the motor by a current detection circuit, and feed back the current current of the motor to a control unit of the motor.

Wherein, the motor includes a wheel hub comprised of a plurality of permanent magnets, and the relative position of a magnetic field produced by a winding of the motor with respect to the permanent magnet is different, and the position of the motor detected by the position sensor is used for calculating a position compensation parameter according to the current position, and a rotating speed calculation unit of the motor obtains a rotating speed of the motor and calculates a corresponsive speed compensation parameter according to the current rotating speed of the motor.

In summation, the present invention has the following advantages and effects. The weight loading system for fitness equipments uses the permanent magnet brushless DC motor of the external rotor structure to replace the traditional block as a weight, so that the structure is simple, easy, and lightweight, and the principle of electromagnetism is used to adjust the force of the weight to achieve the stepless control effect, and the training becomes more effective, and this system can control the rotating speed of the motor to overcome the problem of the prior art and the issue of dropping the clump weight or damaging the equipment while loosening the power driving mechanism. In addition, the motor of the present invention is a permanent magnet brushless DC motor with the wheel hub structure, so that the load capacity is large, and it is not necessary to install an additional reducer to increase the load capacity, so as to simplify the structure and lower the cost. During the stretching or retracting process, the speed and the force can be controlled to achieve a good using effect.

DESCRIPTION OF THE PREFERRED EMBODIMENTS

The above and other objects, features and advantages of this disclosure will become apparent from the following detailed description taken with the accompanying drawings.

Figure 1:
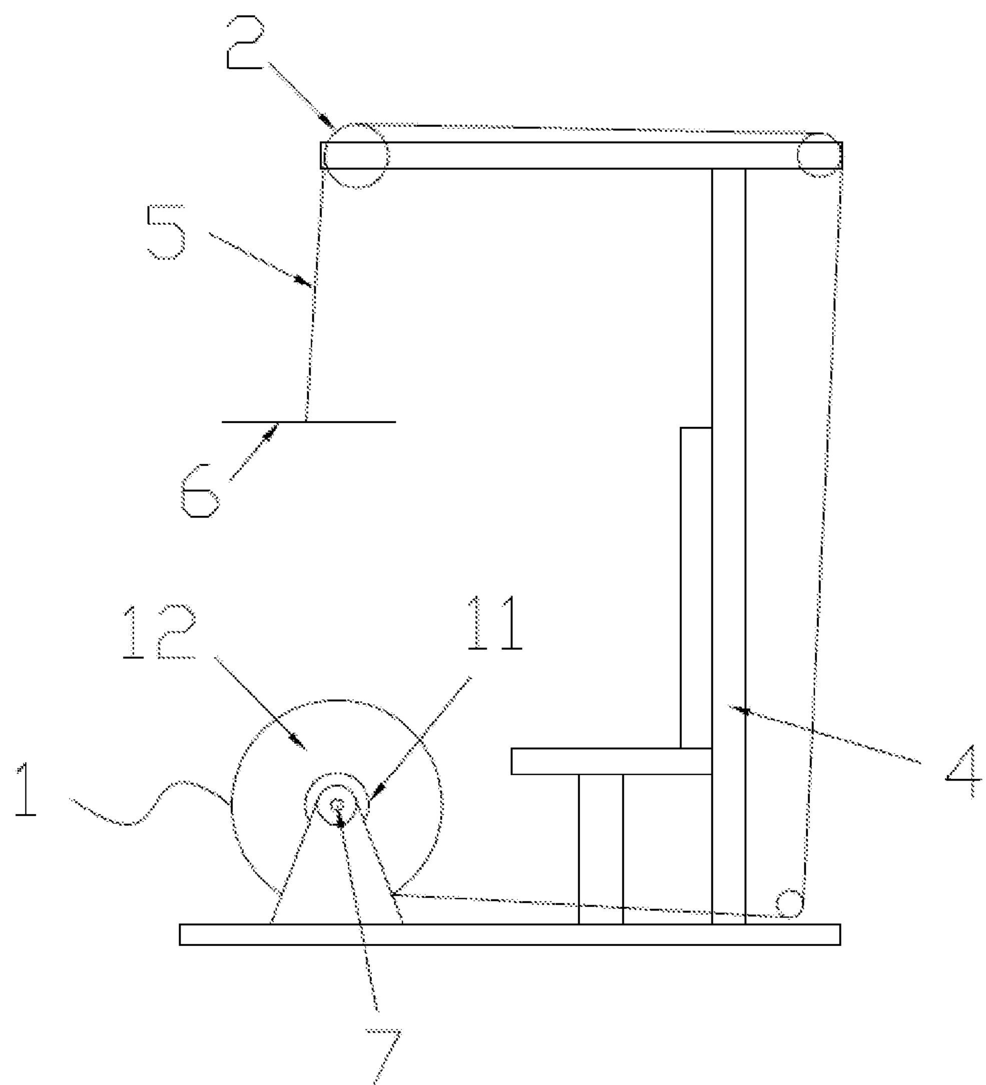
FIG. 1 is a schematic planar view of a fitness equipment of the present invention.
Figure 3:
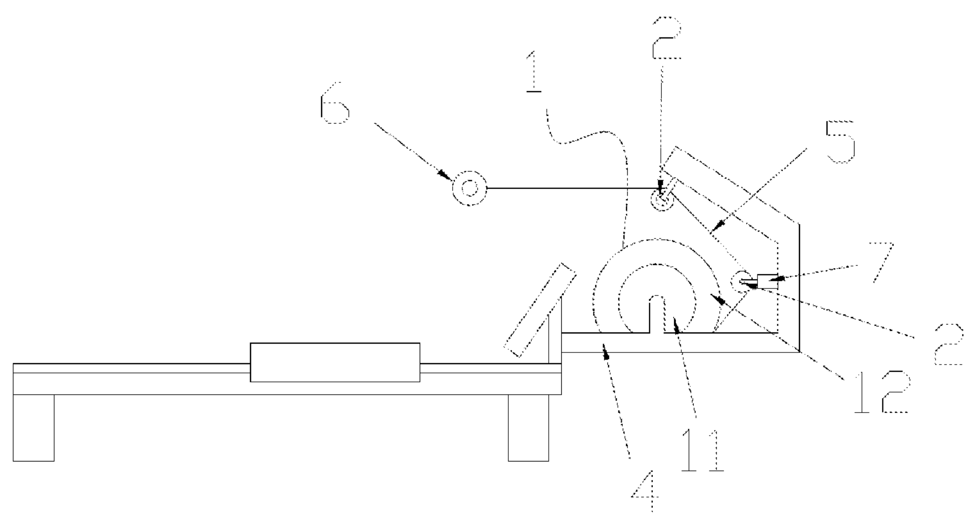
FIG. 3 is a schematic planar view of another weight loading system for fitness equipments in accordance with the present invention.

With reference to FIGS. 1 and 3 for a fitness equipment provided for training a user's back, and the fitness equipment comprises a fitness equipment support (4), a rally rope (5), a motor (1), a motor driving module and a motor control unit; the motor (1) is a permanent magnet brushless DC motor with an external rotor structure, and specifically a wheel hub type motor, and the motor includes a stator (11) mounted onto the fitness equipment support (4) and an external rotor (12) sheathed on the stator (11) and rotatable with respect to the stator (11), and the rally rope (5) is wound around the external rotor (12) of the motor (1), and an end of the rally rope (5) is coupled to the external rotor of the motor (1), and the other end of the rally rope (5) is coupled to the power driving mechanism (6) of the fitness equipment; the power driving mechanism (6) is provided for driving the external rotor (12) of the motor (1) through the rally rope (5) to rotate and generate a rally, and the motor control unit controls the motor to rotate in an opposite direction through the motor driving module, so as to produce a load force opposite to the rally. In fact, the load force is slightly smaller than the rally of the power driving mechanism (6) so as to produce an applying force of the weight.

The present invention further comprises a tension sensor (7) for detecting a rally produced by the power driving mechanism currently. The tension sensor (7) may be installed onto the pulley (2) or between the shaft of the motor (1) and the fitness equipment support (4), or any other appropriate position as needed.

The power driving mechanism (6) is a handle ring or a rally bar, and a human body can control the rally rope (5) through the handle ring or the rally bar to drive the external rotor of the motor (1) to rotate, so as to produce the rally.

The present invention further comprises a pulley (2) installed to the fitness equipment support (4) and coordinated with the transmission of the rally rope (5).

Figure 2:
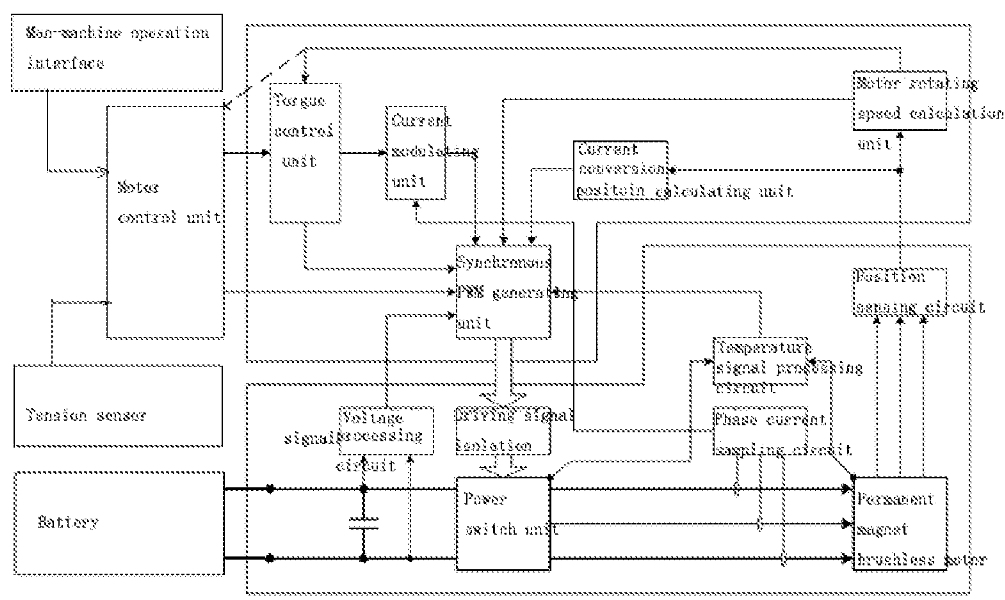
FIG. 2 is a schematic view showing the operating principle of a weight loading system for fitness equipments in accordance with the present invention.

With reference to FIG. 2 for a schematic view showing the operating principle of a weight loading system for fitness equipments in accordance with the present invention, the weight loading system comprises an operation interface module, a torque control unit, a current regulating unit, a position sensing circuit and a power switch module, wherein the motor driving module includes a synchronous PWM generating unit.

The position sensing circuit is provided for sensing a rotating position and a rotating speed of the external rotor (12) to determine whether the rally rope (5) is situated in a stretched status or a retracted status, and the motor control unit includes a memory unit for recording an initial position of the external rotor (12) to control the external rotor to return to its initial position.

The operation interface module is provided for inputting an analog electromagnetic force Fe, such that when the tension sensor (7) detects the rally Fc produced by the power driving mechanism (6) currently, the motor control unit regulates the current of the motor (1) according to the difference of the rally Fe−Fc by the torque control unit and the current regulating unit, and a control module of the motor (1) controls transmitting the current information and switch status module to the power switch module by the synchronous PWM generating unit to drive the motor (1) to work or generate electric power.

The present invention further comprises a battery, such that when the rally rope (5) on the external rotor (12) is situated at a stretched status, the winding of the motor (1) produces a potential, and the power switch module transmits and stores the electricity generated by the potential into the battery, and the electricity stored in the battery provides a driving force to the external rotor (12) when the rally rope (5) is being retracted.

To improve the fitness exercise effect, the present invention further comprises two switches for increasing and decreasing the electromagnetic force Fe, and the switches is coupled to the motor control unit. During a fitness exercise process, the force can be controlled anytime to achieve the best fitness exercise effect.

The present invention further comprises a motor rotating speed calculation unit and a current converting position calculation unit, wherein the motor rotating speed calculation unit and the current converting position calculation unit are controlled by and coupled to the synchronous PWM generating unit, and the motor rotating speed calculation unit is provided for calculating the rotating speed and direction of the external rotor (12), and the current converting position calculation unit is provided for calculating a switch status required by the power switch module according to the information of the position sensing circuit.

When the rally rope (5) is in the retracted status and Fe>Fc, the torque control unit and the current regulating unit are used to increase the current; when the rally rope (5) is in the retracted status and Fe<Fc, the torque control unit and the current regulating unit are used to decrease the current.

When the rally rope (5) is in the stretched status and Fe>Fc, the torque control unit and the current regulating unit drives the motor (1) to be situated in a resisted status through the power switch module.

When the rally rope (5) is in the stretched status and Fe<Fc, the torque control unit and the current regulating unit charge the battery by the power switch module.

The present invention further provides a weight method comprising the following steps:

setting the magnitude of an analog electromagnetic force Fe, and detecting the current rally Fc by a rally sensor, increasing a duty cycle by a PWM method to increase the current of the motor (1) when Fe−Fc>0, and decreasing the duty cycle to decrease the current of the motor (1) when Fe−Fc<0;

detecting the current current of the motor (1) by a current detection circuit, and feeding back the current current of the motor (1) to a control unit of the motor (1);

wherein, the motor (1) includes a wheel hub comprised of a plurality of permanent magnets, and the relative position of a magnetic field produced by a winding of the motor (1) with respect to the permanent magnet being different, and the position of the motor (1) detected by the position sensor is used for calculating a position compensation parameter according to the current position.

Figure 4:
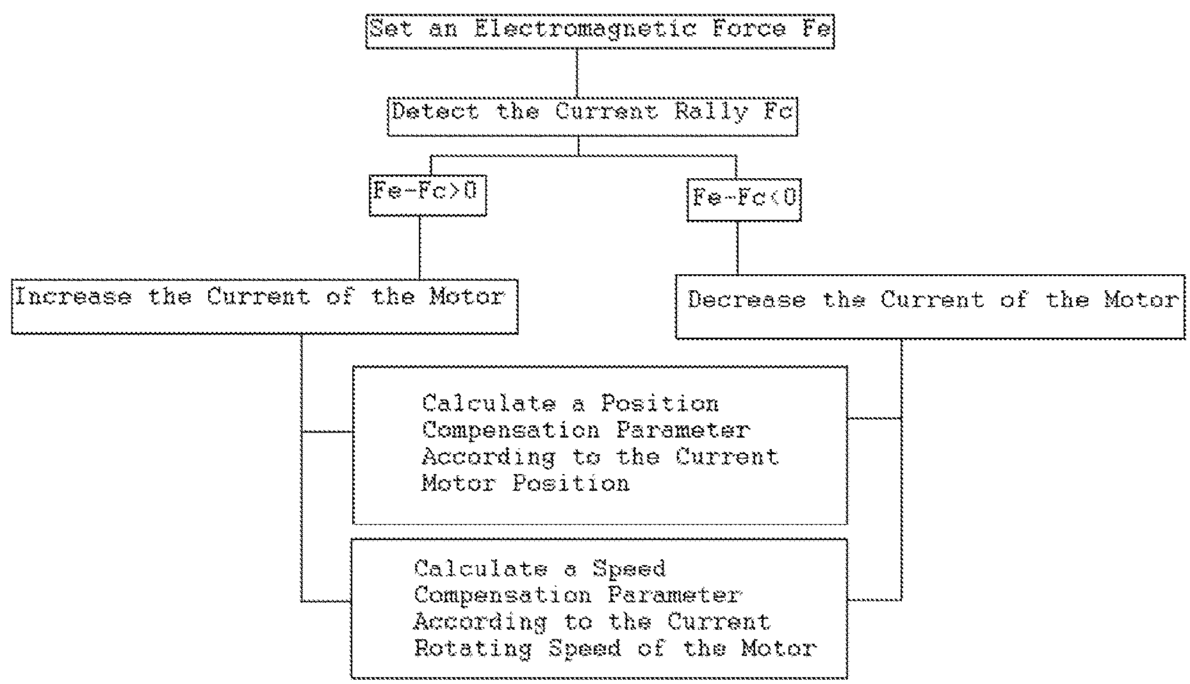
FIG. 4 is a schematic view showing the operating principle of a weigh method in accordinance to the present invention.

A motor rotating speed calculation unit obtains a rotating speed of the motor (1), and calculates a corresponsive speed compensation parameter according to the current rotating speed of the motor (1). With reference to FIG. 4 for the specific process, an analog electromagnetic force Fe is inputted from a man-machine operation interface, and Fe is equivalent to the weight of an iron block or a load selected for a conventional fitness equipment, and the intensity of such force is stepless and measured in the unit of Kg, and such force is unlike the combination of iron blocks having a limited weight. The position detection circuit and the memory of the motor control unit are operated together to detect whether or not the fitness equipment is situated at an initial status. If the fitness equipment is not situated at the initial status, the rotation of the motor (1) will be controlled to set the fitness equipment back to its original position.

When a user starts the fitness exercise, the user pulls the handle bar downward, and transmits the force through the rally rope (5) and the pulley (2) to the tension sensor and further to the motor external rotor (12) of the motor (1) wound with the rally rope (5), and the tension sensor will detect the current rally Fc, and the motor control unit adjusts the current of the motor (1) by the torque control unit and the current regulating unit according to the rally difference Fe−Fc. If Fe−Fc>0, then the current of the motor (1) will be controlled to increase, or else the current of the motor (1) will be decreased. The regulation algorithm may be a classical PID algorithm or a fuzzy control algorithm, or any other appropriate algorithm. Regardless of which algorithm is used, the pulse width modulation (PWM) method may be used to control the motor (1), or change the duty cycle of the winding of the motor (1) to determine the current of the motor (1).

The control of the current of the motor (1) is related to different factors, and the following factors will be taken into consideration:

Setting a target rally Fe: Without considering the mechanical efficiency of the rally rope (5) and the pulley (2), Fe mainly determines the torque required by the motor (1), and the torque of the motor (1) is related to the current passing through the winding of the motor. In other words, the required current may be calculated by Fe.

Supplying a DC voltage: The voltage of a power supply varies. Even if the duty cycle value is equal, the current output may be different. Therefore, it is necessary to have a voltage sample of the power supply by a voltage signal processing circuit, and perform an AD conversion. A corresponding voltage compensation parameter may be calculated according to a voltage signal.

The position of the motor (1): A permanent magnet DC brushless motor is a wheel hub motor comprised of a plurality of permanent magnets. Since the relative position for the winding of the motor to produce a magnetic field by the permanent magnet varies, the torque produced by a motor with the same current is different (In other words, the rally is different. An encoding sensor (which is a part of the position sensing circuit) is provided for detecting the position of the motor (1). The corresponding position compensation parameter can be calculated according to the position of the current.

The rotating speed of the motor (1): When the motor (1) is rotated, a counter potential is produced. Even if the duty cycle value is the same, the rotating speed, and the output current may be different. The position sensing circuit is provided for detecting the position of the motor (1), so the motor rotating speed calculation unit may obtains the rotating speed of the motor (1) by software. Therefore, the corresponding speed compensation parameter can be calculated according to the current rotating speed of the motor (1).

Another effect of the position sensing circuit is to change phases. The permanent magnet DC motor of the invention has a three-phase winding, so that when the motor is rotated, it is necessary to change the phase anytime. A Hall sensor is installed inside the motor, and a current conversion calculation unit is provided for providing a signal while the current is converted. The signal is combined with the aforementioned parameters, and the synchronous PWM generating unit generates six complementary three-phase PWM waveforms, and a driving signal isolation circuit increments the waveform by 1, and perform a high/low voltage isolation, and then transmits the waveform to a three-phase voltage inverter circuit to drive the permanent magnet brushless motor" to achieve a power output up to the level of several kilowatts.

A phase current sampling circuit is provided for detecting the current current of the motor current and feeding back the current to the motor control unit. The phase current sampling circuit is a part of motor protection circuit, wherein if the current exceeds a specific threshold, an alarm is alerted or the operation of the motor is stopped. A temperature signal processing circuit is provided for protecting a high power MOS tube in the three-phase voltage inverter circuit, to prevent the tube from being overheated or disabled.

The weight loading system for fitness equipments uses the permanent magnet brushless DC motor of the external rotor structure to replace the traditional block as a weight, so that the structure is simple, easy, and lightweight, and the principle of electromagnetism is used to adjust the force of the weight to achieve the stepless control effect, and the training becomes more effective, and this system can control the rotating speed of the motor to overcome the problem of the prior art and the issue of dropping the clump weight or damaging the equipment while loosening the power driving mechanism.

While the invention has been described by means of specific embodiments, numerous modifications and variations could be made thereto by those skilled in the art without departing from the scope and spirit of the invention set forth in the claims.

What is claimed is:

1. A weight loading system for a fitness equipment comprising a power driving mechanism, the weight loading system comprising:

a fitness equipment support, a rally rope, a motor, a motor driving module and a motor control unit, wherein the motor is a permanent magnet brushless DC motor, and the motor includes a stator mounted onto the fitness equipment support and an external rotor sheathed on the stator and rotatable with respect to the stator, and the rally rope is wound around the external rotor of the motor, and an end of the rally rope is coupled to the external rotor of the motor, and the other end of the rally rope is coupled to a power driving mechanism of a fitness equipment; the power driving mechanism is provided for driving the external rotor of the motor through the rally rope to rotate and generate a rally, and the motor control unit controls the motor to rotate in an opposite direction through the motor driving module, so as to produce a load force opposite to the rally;

the weight loading system further comprising a tension sensor for detecting the rally produced by the power driving mechanism currently;

the weight loading system further comprising an operation interface, a position sensing circuit and a power switch; the motor driving module comprising a synchronous PWM generating unit, wherein the position sensing circuit is provided for sensing a rotating position of the external rotor to determine whether the rally rope is situated in a stretched status or a retracted status, and the motor control unit comprises a memory unit for recording an initial position of the external rotor to control the external rotor to return to the initial position thereof; the operation interface is provided for inputting an analog electromagnetic force Fe, such that when the tension sensor detects the rally Fc produced by the power driving mechanism currently, a current of the motor is regulated by the motor control unit according to a difference of the rally Fe−Fc, and a current information and a switch status are transmitted by the synchronous PWM generating unit to the power switch to drive the motor to work or generate electric power;

the weight loading system further comprising a battery, such that when the rally rope on the external rotor is situated at the stretched status, a winding of the motor produces a potential, and the power switch transmits and stores an electricity generated by the potential into the battery, and the electricity stored in the battery provides a driving force to the external rotor when the rally rope is being retracted;

when the rally rope is in the retracted status and Fe>Fc, the current is increased; when the rally rope is in the retracted status and Fe<Fc, the current is decreased; when the rally rope is in the stretched status and Fe>Fc, the motor is driven in a resisted status through the power switch; when the rally rope is in the stretched status and Fe<Fc, the battery is charged by the power switch.

2. The weight loading system according to claim 1, further comprising a pulley installed to the fitness equipment support and coordinated with the transmission of the rally rope.

3. The weight loading system according to claim 1, wherein the motor is a wheel hub type motor.

4. The weight loading system according to claim 1, further comprising two switches for increasing and decreasing the electromagnetic force Fe, and the switches being coupled to the motor control unit.

5. A fitness equipment, comprising a weight loading system and a power driving mechanism, the weight loading system comprising:

a fitness equipment support, a rally rope, a motor, a motor driving module and a motor control unit, wherein the motor is a permanent magnet brushless DC motor, and the motor includes a stator mounted onto the fitness equipment support and an external rotor sheathed on the stator and rotatable with respect to the stator, and the rally rope is wound around the external rotor of the motor, and an end of the rally rope is coupled to the external rotor of the motor, and the other end of the rally rope is coupled to the power driving mechanism of the fitness equipment; the power driving mechanism is provided for driving the external rotor of the motor through the rally rope to rotate and generate a rally, and the motor control unit controls the motor to rotate in an opposite direction through the motor driving module, so as to produce a load force opposite to the rally;

the weight loading system further comprising a tension sensor for detecting the rally produced by the power driving mechanism currently;

the weight loading system further comprising an operation interface, a position sensing circuit and a power switch; the motor driving module comprising a synchronous PWM generating unit, wherein the position sensing circuit is provided for sensing a rotating position of the external rotor to determine whether the rally rope is situated in a stretched status or a retracted status, and the motor control unit comprises a memory unit for recording an initial position of the external rotor to control the external rotor to return to the initial position thereof; the operation interface is provided for inputting an analog electromagnetic force Fe, such that when the tension sensor detects the rally Fc produced by the power driving mechanism currently, a current of the motor is regulated according to a difference of the rally Fe−Fc, and a current information and a switch status are transmitted by the synchronous PWM generating unit to the power switch to drive the motor to work or generate electric power;

the weight loading system further comprising a battery, such that when the rally rope on the external rotor is situated at the stretched status, a winding of the motor produces a potential, and the power switch transmits and stores an electricity generated by the potential into the battery, and the electricity stored in the battery provides a driving force to the external rotor when the rally rope is being retracted;

when the rally rope is in the retracted status and Fe>Fc, the current is increased; when the rally rope is in the retracted status and Fe<Fc, the current is decreased; when the rally rope is in the stretched status and Fe>Fc, the motor is driven in a resisted status through the power switch; when the rally rope is in the stretched status and Fe<Fc, the battery is charged by the power switch;

wherein the power driving mechanism is a handle ring or a rally bar, and the rally rope is configured to be controlled through the handle ring or the rally bar to drive the external rotor of the motor to rotate, so as to produce the rally.

* * * * *